United States Patent Office 3,030,186
Patented Apr. 17, 1962

3,030,186
MANUFACTURE OF HYDROGEN PEROXIDE
Donald F. Kreuz, Buffalo, and Leonard R. Darbee, Grand Island, N.Y., assignors to FMC Corporation, a corporation of Delaware
No Drawing. Filed May 16, 1958, Ser. No. 735,675
2 Claims. (Cl. 23—207)

The present invention relates to the manufacture of hydrogen peroxide by the so-called anthraquinone process and more particularly to the employment of a catalyst carrier having controlled and selected surface characteristics and configurations.

As is known, hydrogen peroxide can be produced readily and cheaply by alternate reduction and oxidation of anthraquinones and particularly the alkylated anthraquinones, which process may be broadly classified as comprising three main stages or operations, the first stage being a hydrogenation of the selected anthraquinone, the working material, the second, oxidation of the so hydrogenated working compound with production of hydrogen peroxide and formation of the initial quinone. The third stage comprises the separation of the so formed hydrogen peroxide, which separation may be by distillation or by water extraction and generally by the employment of the latter procedure.

Although the anthraquinone process proceeds smoothly and is presumed to be economically advantageous, the working solution which comprises a solvent or a mixture of solvents capable of dissolving the quinone form of the working material as well as the hydroquinone form thereof represents a considerable capital investment and as operated heretofore, degradation of the working material may be at times of very significant proportions and result in loss of productive working material with a concomitant loss of hydrogen peroxide production. Such loss may under some conditions be so high as about 13% of workable quinone material in about 2,000 hours of operation.

The commercial operation as practiced heretofore comprised suspension of the hydrogenation catalyst in the working solution while the latter was in contact with hydrogen gas. Such an operation is generally referred to as "fluidized" and requires that the average particle size of the catalyst be small and under such circumstances reactivity of the catalyst is high. The catalyst most generally employed in present commercial operations of the so-called anthraquinone process and which are employed as fluidized catalyst are the Raney nickel catalyst and a catalyst composed of a carrier of activated adsorbent material such as activated micro-porous or gamma alumina or micro-porous activated silica gel upon which metallic palladium is deposited.

In small particulate form in which these catalysts are employed as fluidized catalysts, several hydrogenation reactions proceed simultaneously but with different reaction rates. The predominant hydrogenation reaction is of course the change of the quinone group to the hydroquinone group or the change of a quinone to a quinhydrone. Proceeding simultaneously with the predominant reaction, nuclear hydrogenation of the anthraquinone tends to occur at a determinable and measurable rate with the formation of tetrahydro derivatives of the working material but without destruction of the quinone group or the ability alternately to reduce and oxidize that group with the production of hydrogen peroxide.

Other hydrogenation reactions, all undesirable, also proceed but at reaction rates below the rate of hydrogenation of the nucleus. These hydrogenations are undesirable since they result in degradation products not capable of being further reduced and subsequently oxidized with the production of hydrogen peroxide.

Whereas it has been generally understood heretofore that a fixed catalyst bed operation in the hydrogenation stage would require a larger particle size, and since the surface area is inversely proportional to the particle size, such operation would involve either a greater contact time with the catalyst or the employment of a greater weight of catalyst per unit of working material, both of which are conditions favoring the unwanted hydrogenation reaction with production of degraded products. This invention provides means for circumventing these difficulties.

In accordance with the present invention a carrier for the metallic catalyst is chosen within the range 4 mesh to 60 mesh and possessing very specific surface characteristics. Thus for fixed bed operations in the hydrogenation stage of the anthraquinone process it is desirable that the so-called micro-porosity be as small as possible and generally be less than about 0.03 cc. per gram. The micro-porosity is defined as the volume of pores of less than 800 A. diameter. This characteristic can be measured by the method of Benesi, Bonnar and Lee, Anal. Chem., vol. 27, page 1963 (1955) "Determination of Pore Volume of Solid Catalysts."

This requirement of a minimum of micro-porosity is in direct contrast with the requirement that this characteristic be present in catalyst carriers employed in fluidized operations where the catalyst is suspended in the stream of the working solution.

In addition to low micro-porosity the catalyst carrier should possess a relatively low surface area, in general a surface area of less than 5 square meters per gram.

In the broad concept of the present invention a working material which is an alkylated anthraquinone is dissolved in any suitable solvent. These working materials may be any of the 2-ethyl, 2-isopropyl, 2-secondary butyl, 2-tertiary butyl, 2-secondary amyl, 1,3-dimethyl, 2,3-dimethyl, 1,4-dimethyl, and 2,7-dimethyl anthraquinone among others, as well as mixtures of these materials. The corresponding tetrahydro anthraquinones may also be employed, examples of which are 2-ethyl tetrahydro anthraquinone and 2-tertiary butyl tetrahydro anthraquinone, as may mixtures of the above.

These working materials are generally dissolved in a solvent not soluble in water and, in general, in a so-called mixed solvent which contains a constituent for dissolving the hydroquinone form of the working material and a constituent for dissolving the quinone form of the working material. These solvents are well known in the art and there is employed in the present invention any of these conventional solvents. Some of the commercially employed solvents are described in U.S. Patents Nos. 2,215,883, 2,537,516, 2,537,655, 2,768,065, 2,768,066, 2,657,980 and British Patent 769,515, among others.

As hydrogenation catalyst there is employed in the present invention one of the noble metals, as for instance palladium carried upon a support possessing the characteristics heretofore mentioned. Since palladium is the best known of the noble metals of the so-called platinum and palladium group such as rhodium, ruthenium, palladium and platinum, suitable for use catalytically to aid the reaction, quinone to hydroquinone, palladium is illustrated herein as the catalyst employed, similar results being obtainable for the other noble metals.

In the table below there is listed a series of catalysts together with a notation of the surface area and the pore volume, the surface area being expressed in square meters per gram, the pore volume being expressed in cc's. per gram.

Each of the catalysts contained 0.5% to 1% palladium by weight and was prepared by depositing palladium chloride on carrier material which ranged in particle size from about 4 to 60 mesh with the bulk of the carrier having a particle size of 10 to 20 mesh, and subsequent reduction of the palladium salt to the free metal.

TABLE 1

| Sample | Surface Area, per gram | Pore Volume, per gram |
|---|---|---|
| A. Alpha-Alumina | 1 sq. meter | Less than 0.001 cc. |
| B. Gamma-Alumina | 210 sq. meters | 0.145 cc. |
| C. Periclase (MgO) | less than 2 sq. meters. | 0.003 cc. |
| D. $SiO_2 Al_2O_3$ (85%–15%) | 40 sq. meters | 0.095 cc. |
| E. Calcium Carbonate | 1 sq. meter | 0.004 cc. |
| F. $SiO_2$ (low surface) | less than 2.5 sq. meters. | less than 0.001 cc. |
| G. Silicon Carbide | 1 sq. meter | 0.001 cc. |
| H. Magnesium Carbonate | 1 sq. meter | 0.002 cc. |

Contrary to the indications in the prior art that the carrier composition affects catalyst activity, the examples below show that excellent hydrogenation results, and therefore production of hydrogen peroxide can be obtained, with a diversity of catalyst carrier composition and that, in fact, the important feature resides in providing not "an active micro-porous surface" but rather one that may be designated as relatively smooth.

Example 1

3.0 liters of a palladium on gamma-alumina catalysts (B in Table 1) was placed in the fixed bed hydrogenator section of a cycling system composed of the stages hereinbefore described. The working solution charged into the reactor was composed of a mixture of approximately equal amounts of 2-ethylanthraquinone and its tetra hydro derivative dissolved in a mixture of dimethyl naphthalene and trioctylphosphate. The work solution contained 0.45 mole of quinone per liter of solution.

The hydrogenation was carried out at 2 atomspheres hydrogen pressure and 45° C. to 50° C. The ratio of the total flow of work solution over the catalyst to the forward flow of work solution through the reactor could be regulated to provide any depth of hydrogenation desired. The system was operated in such a manner that the rates of reaction of quinone to hydroquinone and hydroquinone to degradation products could be determined separately. The ratio of these rates was found to be $1:186 \times 10^{-4}$. This corresponds to a loss of quinone of 9.3 moles per 1000 moles of 100% peroxide produced, when the depth of hydrogenation is regulated to 50% of the total quinone present in solution.

Example 2

2.7 liters of a 1% palladium on alpha-alumina catalyst (A in Table 1) was charged into a fixed bed hydrogenator and cycling was carried out under essentially the same conditions as described in Example 1. The loss of quinone was found to be 0.25 mole per 1000 moles of 100% hydrogen peroxide produced; when the depth of hydrogenation is regulated to 50% of the total quinone present in solution. The loss of working material in Example 1 was 37 times that in Example 2.

Example 3

1.5 liters of a 1.0% palladium on MgO catalyst (C in Table 1) was charged into the fixed bed hydrogenator and cycling was carried out essentially as described in Example 1. The loss in quinone was found to be substantially nil (less than 0.06 mole per 1000 moles of 100% $H_2O_2$ produced) when the depth of reduction is regulated to 50% of the total quinone present in solution.

Example 4

3.0 liters of a 1% palladium on silica alumina catalyst (D in Table 1) was charged into the fixed bed hydrogenator and cycling was carried out essentially as described in Example 1. The loss in quinone was found to be 9.3 moles per 1000 moles of 100% hydrogen peroxide produced, when the depth of reduction is regulated to 50% of the total quinone content of the solution.

Example 5

0.8 liter of 0.5% palladium on calcium carbonate catalyst (E in Table 1) was charged into the fixed bed hydrogenator and cycling was carried out essentially as described in Example 1. The loss in quinone was found to be less than 0.06 mole of quinone per 1000 moles of 100% hydrogen peroxide produced, when the depth of reduction is regulated to 50% of the total quinone content of the solution.

Example 6

2.4 liters of a 1.0% palladium on low surface silica catalyst (F in Table 1) was charged into the fixed bed hydrogenator and cyciing was carried out essentially as described in Example 1, but at a temperature of 55° C. The loss in quinone was found to be 1.3 moles per 1000 moles of 100% hydrogen peroxide, produced when the depth of reduction is regulated at 50% of the total quinone content of the solution.

Example 7

3.0 liters of a 1% palladium on silicon carbide catalyst (G in Table 1) was charged into the fixed bed hydrogenator and cycling was carried out essentially as described in Example 1. The loss in quinone was found to be 0.0 mole of quinone per 1000 moles of 100% hydrogen peroxide produced, when the depth of reduction is regulated to 50% of the total quinone content of the solution.

Example 8

0.8 liter of an 0.5% palladium on magnesium carbonate catalyst (H in Table 1) was charged into the fixed bed hydrogenator and cycling was carried out essentially as described in Example 1. The loss in quinone was found to be less than 0.06 mole of quinone per 1000 moles of 100% hydrogen peroxide produced, when the depth of reduction is regulated at 50% of the total quinone content of the solution.

In the case of those catalysts where excellent control was obtained, namely in Examples 2, 3, 5, 6, 7 and 8, it will be noted that the catalyst possessed a micro-porosity of less than 0.03 cc. per gram and a surface area of less than 5 square meters per gram.

It will be understood that the examples given above are purely illustrative of the broad concepts of the invention. Thus it is known that an alkylated anthraquinone, other than the 2-ethyl derivative, may be alternately reduced and oxidized with the production of hydrogen peroxide, and the invention contemplates the use of any of such known and used alkylated anthraquinones, their tetrahydro derivatives or mixtures thereof.

Furthermore it is known that the solubility of certain alkylated anthraquinones may, under some conditions, be greater in certain solvents than other alkylated anthraquinones, or that certain solvents possess a greater dissolving power for either the hydroquinone form or the quinone form of the particular alkylated anthraquinone or mixtures of alkylated anthraquinone employed as the working material. Such variations do not affect the results obtainable by the choice of physical characteristics of the catalyst carrier specified herein.

Furthermore it will be understood that the examples specifically illustrated employ the noble metal palladium, since that particular metal catalyst is known to be somewhat more desirable in the hydrogenation of an alkylated anthraquinone to an alkylated anthrahydroquinone than the other noble metals mentioned herein and contemplated as within the invention.

The amount of palladium deposited upon the catalyst carrier will, in accordance with the present invention, be in the range 0.1% to 2% by weight. The amounts given in the examples, namely 0.5% to 1% have been chosen in that narrow margin more effectively to illustrate the function of the surface characteristics of the carrier rather than to emphasize the importance of any particular catalyst metal carried thereon.

In summary therefore, the invention is directed to the physical characteristics and particularly the surface characteristics, as defined, of the carrier and not to any specific action of the metal catalyst, namely, a surface area in the range 5 to 0.001 square meters per gram and a microporosity not exceeding about 0.03 cc. per gram.

What is claimed is:

1. In the production of hydrogen peroxide by the alternate reduction and oxidation of an alkylated anthraquinone as the working material carried in solution and wherein the working material is hydrogenated by passage through a fixed particulate catalyst bed of a noble metal catalyst deposited as a surface coating upon an inert solid carrier, that improvement comprising such inert carrier being within the range of 4 mesh to 60 mesh and having a surface area of less than five square meters per gram and a pore volume as to pores of less than 800° A. of less than 0.03 cc. per gram.

2. The process of claim 1 wherein the noble metal catalyst is palladium and in which said inert carrier being within the range of 4 mesh to 60 mesh and having a surface area of less than 5 square meters per gram and a pore volume as to pores of less than 800 A. of less than 0.03 cc. per gram, is from the group consisting of alumina, magnesium oxide, calcium carbonate, silica, silicon carbide and magnesium carbonate.

References Cited in the file of this patent

UNITED STATES PATENTS

| | | |
|---|---|---|
| 2,657,980 | Sprauer | Nov. 3, 1953 |
| 2,800,518 | Pitzer | July 23, 1957 |
| 2,983,584 | Sancelme | May 9, 1961 |

FOREIGN PATENTS

| | | |
|---|---|---|
| 542,515 | Belgium | May 3, 1956 |